United States Patent [19]

LaRussa

[11] 4,437,114
[45] Mar. 13, 1984

[54] ROBOTIC VISION SYSTEM

[75] Inventor: Joseph A. LaRussa, Yorktown Heights, N.Y.

[73] Assignee: Farrand Optical Co., Inc., Valhalla, N.Y.

[21] Appl. No.: 385,465

[22] Filed: Jun. 7, 1982

[51] Int. Cl.$^3$ .............................................. H04N 7/18
[52] U.S. Cl. ..................................... 358/101; 358/225
[58] Field of Search ....................... 358/101, 225, 226; 356/388, 392, 393, 394; 364/559

[56] References Cited

U.S. PATENT DOCUMENTS

| | | | |
|---|---|---|---|
| 4,219,847 | 8/1980 | Pinkney | 364/559 |
| 4,328,553 | 5/1982 | Fredriksen | 358/101 |
| 4,330,779 | 5/1982 | Wilensky | 358/101 |

Primary Examiner—Howard W. Britton
Attorney, Agent, or Firm—Anthony H. Handal

[57] ABSTRACT

A robotic system for grasping a randomly oriented object, comprising grasping means for grasping said object is disclosed. Motor means places the grasping means at a desired position and causes performance of a gripping function. Camera means forms a first image of the object. An optical train conveys an image from a predetermined point to the camera means, the predetermined point being fixed relative to the grasping means. Image means contains a second image of the object to be grasped. Comparison means compares the first image to the second image. First coupling means couples the image means to the comparison means. Second coupling means couples the output of the camera means to the comparison means. Image rotation means causes rotation of the second image with respect to the image produced by the camera means. The comparison means is responsive to the first and second coupling means to stop rotation of the image rotation means when a coincidence in angular position is detected between the second image and the image produced by the camera means. Finally, angular orientation means generates an angular orientation signal in response to a detection of coincidence between the second image and the image produced by the camera means to generate an orientation signal indicating the orientation of the object and providing the orientation signal to the motor means to angularly orient the grasping means with the object to be grasped.

7 Claims, 2 Drawing Figures

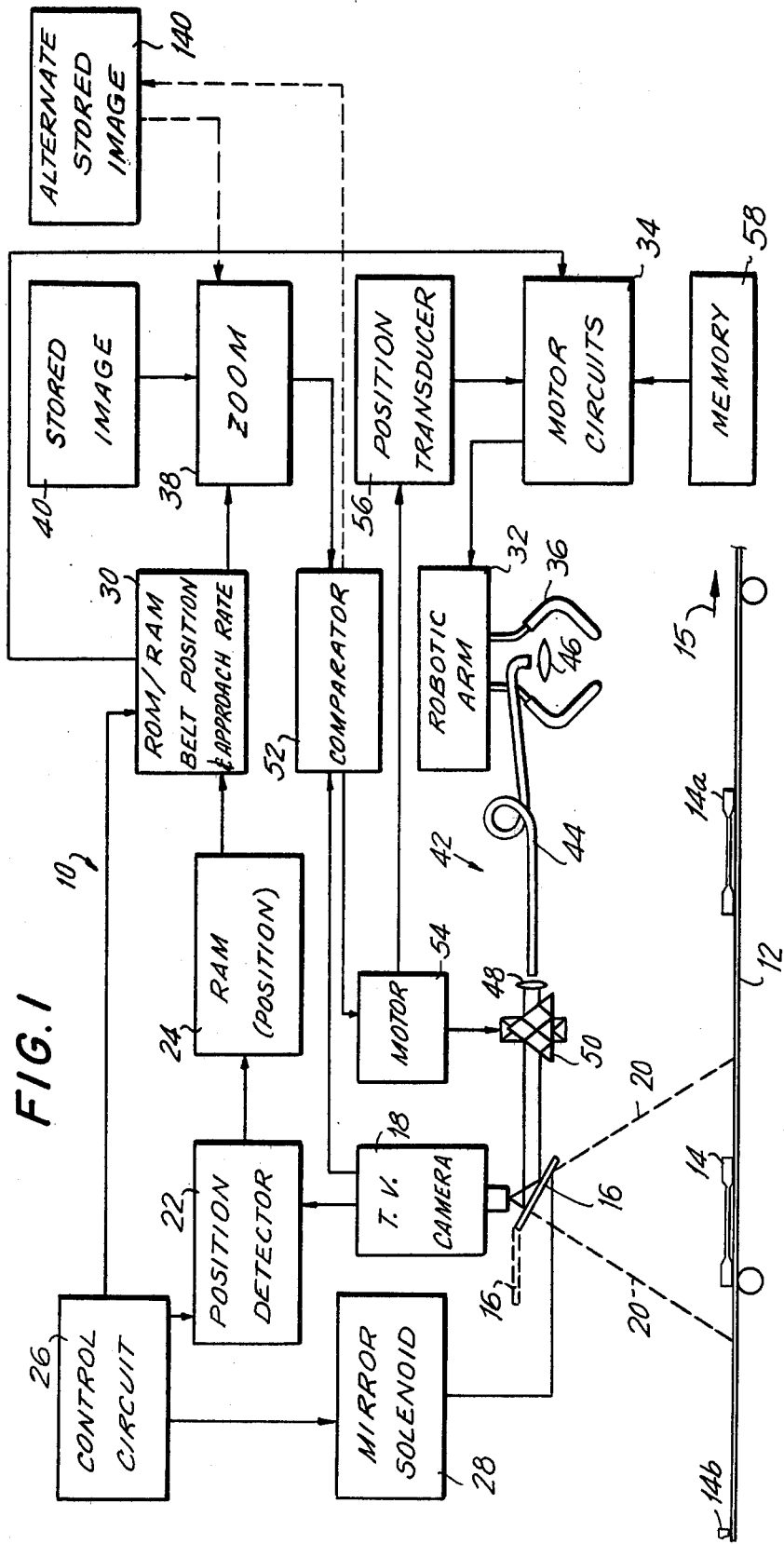
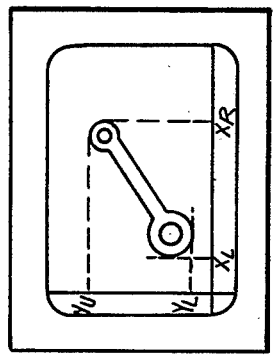
FIG.1
FIG.2

ROBOTIC VISION SYSTEM

TECHNICAL FIELD

The invention relates to a system for visual observation of an object by a robotic system through the use of a video camera which generates video signals; these video signals are compared to a stored image of the object to provide guidance information.

BACKGROUND ART

Robots are seeing widespread application in areas where non-varying tasks must be repeatedly and reliably performed. More advanced robots are capable of being programmed and reprogrammed to perform different tasks. In some cases the programming may simply be accomplished by the programmer's leading the robot by the hand, while the sequence of movement is recorded by the robot's control unit. When the robot is operated, the sequence is simply repeated over and over again and the desired task performed. Additional flexibility may be obtained in such a robot by providing the robot with a plurality of sequences, allowing it to select the appropriate sequence for the job at hand.

Obviously, such robots face the inherent limitation that the object or objects to be operated upon by the robot must be in predetermined positions. Thus, if parts are unoriented or are collected with a number of other parts in a bin, such robots are unable to pick them up without the inclusion of sensory inputs. Such sensory inputs may include vision, touch and hearing. For example, a sense of vision could guide the robot's hand to an object, a sense of touch and hearing could facilitate its grasping the object. Typically, a sense of vision is provided for a robot by using a television camera, such as a vidicon or charged-coupled device together with a computer programmed with relatively complex pattern recognition software. Typically such software would include an "edge finder" subroutine and a complicated algorithm particularly adapted for the particular part involved to convert the edge information into position commands for the robot arm.

DISCLOSURE OF INVENTION

The invention, as claimed, is intended to provide a remedy. It solves the problem of providing a visual sensory input for a system such as a robot without the need for specialized software designed to provide positioning information for each particular object to be grasped.

The same is achieved by storing an image of the particular object and comparing that image to an image generated by a television camera whose optics take a picture from a point which is fixed with respect to a reference position.

BRIEF DESCRIPTION OF DRAWINGS

One way of carrying out the invention is described in detail below with reference to drawings which illustrate only one specific embodiment, in which:

FIG. 1 is a block diagram of the inventive system; and

FIG. 2 is an illustrative diagram illustrating the operation of a possible universal center point determining subsystem for inclusion in the system illustrated in FIG. 1.

BEST MODE FOR CARRYING OUT THE INVENTION

Referring to FIG. 1, a system 10 in the environment of a robotic vision system constructed in accordance with the present invention is illustrated. For purposes of illustration, the vision system 10 is illustrated in conjunction with a conveyor belt 12 performing the function of moving objects 14 such as connecting rods in the direction indicated by arrow 15.

During the initial portion of a robotic grasping sequence, a mirror 16 is positioned as illustrated in phantom lines in FIG. 1 in response to a time control pulse provided by timing control circuit 26 to solenoid 28 which operates mirror 16. This allows camera 18 to view object 14 which is positioned within the field of view of camera 18. The field of view of camera 18 is defined by phantom lines 20. The output of camera 18 is then fed to a position detector 22, which may simply be a microprocessor programmed to detect the position of the object 14 photographed by television camera 18 in response to a timed control pulse. Any one of a number of well-known algorithms may be used in position detector 22 to detect the position of object 14. Referring to FIG. 2, such an algorithm may be one which simply detects a coordinate $X_L$ of the leftmost portion of the object 14 to be identified and the rightmost coordinate of the object $X_R$ as well as the lowermost coordinate $Y_L$ and the uppermost coordinate $Y_U$ of the object as illustrated in FIG. 2. The algorithm would simply average $Y_L$ and $Y_U$ to obtain the Y coordinate, $Y_C$, of the center of the object and $X_L$ and $X_R$ to obtain the X coordinate, $X_C$, of the center of the object. The resulting X coordinate $X_C$ and the resulting Y coordinate $Y_C$ are then fed by the position detector to a memory 24, which may simply be a conventional random access memory. Initiation of the position detection function performed by position detector 22 would be in response to an initiation signal produced by timing control circuit 26 immediately after the generation of another control signal by control circuit 26 to activate mirror solenoid 28 into rotating mirror 16 into the position illustrated in phantom lines. After the actuation of the position detector 22 by control circuit 26, a control signal is sent by the timing control circuit 26 to control circuit 30. This signal tells control circuit 30 to read the position of the center of object 14 which is stored in the random access memory portion of control circuit 30. This complete preview of object 14, allowing the system to proceed with grasping object 14a. Control circuit 30 includes such random access memory circuits, as well as read only memory circuits and a microprocessor for processing position information. Stored in the read only memory portion of control circuit 30 is information with respect to the speed with which conveyor belt 12 is moving and the desired speed with which the robotic arm 32 is desired to approach an object 14a which has been conveyed to it by conveyer belt 12. Circuit 30 combines the position stored in memory 24, with the time that the position was recorded as indicated by a control pule from control circuit 26 and predetermined rates of approach and information with respect to the speed of conveyor belt 12 to send a control signal to motor circuits 34, thus causing robotic arm 32 to center its claw 36 over an object 14a, which was previewed immediately prior to the preview of object 14.

In accordance with the present invention, it is contemplated that the speed of the overall operation will be optimized by proper sequencing of the preview function performed by position detector 22 when mirror 16 is in the position shown in phantom lines and the approach and grasping function controlled by circuit 30. In particular, it is contemplated tht the preview of a part 14 will be followed by the grasping of a part 14a, which in turn will be followed by the previewing of part 14b which, in turn, will be followed by the grasping of object 14, and so forth.

Thus, after object 14 has been previewed and its position stored in memory 24, memory 24, in response to a control signal from control circuit 26 will send location information respecting the center point of object 14a, previously stored in memory 24, to circuit 30. Circuit 30 then calculates the actual position of object 14a using the information produced by memory 24 and the speed of the conveyer belt 12 which is stored in its memory. Using the stored position of object 14a and the speed of the conveyor belt 12, circuit 30 produces control signals which are sent to motor circuits 34 which in turn position robotic arm 32 vertically over part 13a. At the same time circuit 30 produces an approach rate signal which is sent to zoom 38 and motor circuits 34, causing robotic arm 32 to advance toward object 14a at a predetermined rate.

An image of an object such as object 14 or object 14a is stored in memory 40. At the same time that robotic arm 32 is advancing toward object 14a, a picture of the part as seen from a point between the claws 36 of robotic arm 32 is generated by television camera 18. In particular, a fiber optic cable system 42 including a fiber optic bundle 44, input optics 46 and output optics 48 couples an image through a dero 50 to mirror 16 and into camera 18. The image of a typical object 14a may be stored in the memory 40 by any one of a number of means which allow generation of a picture with an image of variable size. For example, the image may be stored in memory 40 in the form of a photographic negative and this image viewed by a zoom television camera 38. The size of the image focused on the vidicon of camera 38 in response to the operation of the zoom lens with which it is provided is adjusted by synchronizing the position of the zoom through a control signal from circuit 30 to result in an image identical to the image size seen by television camera 18 as robotic arm 32 advances toward object 14a.

The outputs of cameras 18 and 38 are sent to a comparator 52. Comparison by comparator 52 is facilitated by synchronizing the scanning of cameras 18 and 38.

If the preview of object 14a has been carried out properly, and the part position after conveyance by the conveyer belt properly calculated, arm 32 should be placed directly over the center of object 14a. Likewise, the operation of zoom camera 38 is synchronized by control circuit 30 to result in a image size at the output of camera 38 equal to the image size aat the output of camera 18. Thus, the only discrepency between the images produced by cameras 18 and 38 will be the angular orientation of object 14 in those pictures. Comparator 52 compares the two images and if there is any angular difference between the pictures displayed in the outputs of the two television cameras, comparator 52 will produce an output signal which is sent to motor 54 causing it to rotate dero 50. Dero 50 is a well known device which has the effect of angularly rotating any real image passed through it in response to its angular position. At the point where motor 54 has rotated dero 50 to a position where the angular orientation of the image produced by camera 18 coincides with that produced by camera 38, comparator 52 will stop motor 54.

Comparator 52 may comprise any one of a number of alternatives. In the instant system, where the scanning in cameras 18 and 38 are synchronized, the two output television signals may simply be added together and comparison achieved by looking at the AC component of the added composite signal. When that AC component becomes zero (because the negative signal seen by camera 38 equals in magnitude the positive signal of camera 18) or an acceptable minimum value below a predetermined threshold value, angular orientation is confirmed and the comparator produces a signal instructing motor 54 to cease rotation. When motor 54 has come to rest, its position is measured by a position transducer 56 which then instructs motor circuits 34 to rotate robotic arm 32 to a position where claws 36 can grasp object 14a. Such grasping may be actuated in response to a predetermined calculated position calculated by control circuit 30, or may be in response to the proximity of object 14a. After the object is grasped and the desired work done with it in accordance with preprogrammed information sent to motor circuits 34 by memory 58, robotic arm 32 is repositioned for receiving instructions with respect to picking up the next object, namely, object 14, and the sequence repeated.

It is thus seen how a method is provided for grasping objects having a random orientation on a conveyer belt. If it is desired to grasp an object from a bin containing many objects, the same may be achieved by using a suitable claw to pickup objects singly and deposit them on conveyer belt 12 with a random orientation. Once the objects are deposited with a random orientation, such as that of object 14b, they will pass into the field of view 20 of camera 18 for preview and accurate grasping when they pass into the position occupied by object 14a in FIG. 1. It is thus seen how a method is also provided for removing randomly oriented parts from a bin and performing a desired robotic operation upon them.

A variation of the disclosed system is illustrated in phantom lines in FIG. 1. The addition of an alternate stored image 140, allows the system 10 to identify one of two particular objects which the system is to operate on. Likewise, memories 24 and 30 may have information respecting desire movements of objects corresponding to images 40 and 140. During operation of the system with additional stored image 140, the system may alternately operate using image 40 and image 140, if the sequence of parts can be predetermined and made alternate. If the sequence is not known, image 40 can first be tried and then the system can respond to the failure of comparator 52 to find a match with image 40 by attempting a match with image 140. It may aso be desired to add additional stored images 140a, 140b . . . 140n which are sequentially tried until a match is made to recognize and operate on a plurality of objects. Finally, once a match is made from a plurality of objects, motor information for robotic arm 32 may be selected from the information in memory 24 and memory 30 to perform the appropriate function for the particular object involved.

While an illustrative embodiment of the invention has been described, it is, of course, understood that various modifications and uses will be obvious to those of ordinary skill in the art. Uses include visual position identification, recognition and sorting of parts and the like. Grasping may include such functions as positioning a wrench and tightening it and the like. Likewise, the system may be used to operate a robotic arm permanently attached to a tool, such as a wrench or a paint brush, or the like and the inventive system used to locate a part to be operated upon, orient the tool to the part and operate on the tool to perform any of a number of tasks, such as painting a part, tightening a bolt, or the like. In addition, the stored image may be replaced by an actual part mounted for rotation. Another variation may be to replace the fiber optic cable and camera with a charge coupled device placed between claws 36. As an alternative to stored motion information, approach toward a part may be evaluated by automatic focusing and reading the focus point on the lens. Such modifications are within the spirit and scope of the invention which is limited and defined only by the appended claims.

I claim:

1. A robotic system for grasping a randomly oriented object, comprising:
    (a) grasping means for grasping said object;
    (b) motor means for placing said grasping means at a desired position and causing said grasping means to perform a gripping function;
    (c) camera means for forming a first image of said object;
    (d) an optional train for conveying an image from a predetermined point to said camera means, said predetermined point being fixed relative to said grasping means;
    (e) image means for containing a second image of said object to be grasped;
    (f) comparison means responsive to said first and second images for comparing said first image to said second image;
    (g) first coupling means for coupling said image means to said comparison means;
    (h) second coupling means for coupling the output of said camera means to said comparison means;
    (i) image rotation means for causing rotation of said second image with respect to the image produced by said camera means, said comparison means being responsive to said first and second coupling means to stop rotation of said image rotation means when a coincidence in angular position is detected between said second image and the image produced by said camera means; and
    (j) angular orientation means for generating an angular orientation signal in respone to a detection of coincidence between said second image and said image produced by said camera means to generate an orientation signal indicating the orientation of said object and providing said orientation signal to said motor means to angularly orient said grasping means with said object to be grasped.

2. A robotic system for operating on a randomly oriented object, comprising:
    (a) tool means for operating on said object;
    (b) motor means for placing said tool means at a desired position and causing said tool means to perform a desired function;
    (c) camera means for forming a first image of said object to be operated upon;
    (d) an optical train for conveying an image from a predetermined point to said camera means, said predetermined point being fixed relative to said tool means;
    (e) image means for containing a second image of said object to be operated upon;
    (f) comparison means responsive to said first and second images for comparing said first image to said second image;
    (g) first coupling means for coupling said image means to said comparison means;
    (h) second coupling means for coupling the output of said camera means to said comparison means;
    (i) image rotation means for causing rotation of said second image with respect to the image produced by said camera means, said comparison means being responsive to said first and second coupling means to stop rotation of said image rotation means when a coincidence in angular position is detected between said second image and the image produced by said camera means; and
    (j) angular orientation means for generating an angular orientation signal in response to a detection of coincidence between said second image and said image produced by said camera means to generate an orientation signal indicating the orientation of said object and providing said orientation signal to said motor means to angularly orient said tool means with said object to be operated upon.

3. A system as in claim 1 or 2, wherein said optical train comprises a fiber optic bundle and said image rotation means is an optical system coupled between said fiber optic bundle and said picture forming means.

4. A system as in claim 2, wherein said camera means includes image deflecting means for alternately viewing an object from said predetermined point or viewing from an other point a second object to be grasped after grasping of said object, said other point positioned to allow a preview of the position of said second object, said second object being positioned in facing spaced relationship to said other point and said object being positioned in facing spaced relationship to said predetermined point, and further comprising position detecting means for detecting the position of said second object and providing that information to said motor means when said second object is in facing spaced relationship to said predetermined point, whereby said motor means will cause said grasping means to approach said object at a predetermined rate.

5. A system as in claim 1 or 4, wherein said second image and said picture forming means both generate images whose configurations are identical and synchronized with each other and said comparator comprises adder means for adding the outputs of said camera means and said image means and removing the alternating current portion of the output of the result of said addition, and means for determining a minimum value in said alternating current portion.

6. A system as in claim 1, 2 or 4, wherein said image means comprises a photographic negative.

7. A robotic system as in claim 1, 2 or 4 wherein the output of one of said camera means and said image means is varied in size by zoom means coupled to the output of said one, the output of said zoom means being coupled to said comparison means.

* * * * *